(12) United States Patent
Seol et al.

(10) Patent No.: US 7,298,337 B2
(45) Date of Patent: Nov. 20, 2007

(54) ANTENNA DEVICE FOR A MOBILE PHONE

(75) Inventors: Dong-Beom Seol, Suwon-si (KR); Jang-Hyun Nam, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 11/296,666

(22) Filed: Dec. 7, 2005

(65) Prior Publication Data

US 2006/0132366 A1 Jun. 22, 2006

(30) Foreign Application Priority Data

Dec. 17, 2004 (KR) ............... 10-2004-0107872

(51) Int. Cl.
*H01Q 1/24* (2006.01)
(52) U.S. Cl. .................. 343/702; 343/906
(58) Field of Classification Search ........ 343/702, 343/700 MS, 895, 906; 455/575.4
See application file for complete search history.

(56) References Cited

U.S. PATENT DOCUMENTS

| | | | | |
|---|---|---|---|---|
| 5,412,392 A | * | 5/1995 | Tsunekawa | ............... 343/702 |
| 5,905,467 A | * | 5/1999 | Narayanaswamy et al. | . 343/702 |
| 5,978,655 A | * | 11/1999 | Ohura et al. | ............... 455/41.1 |
| 6,208,874 B1 | | 3/2001 | Rudisill et al. | |
| 7,106,260 B2 | * | 9/2006 | Ryu et al. | ............... 343/702 |

FOREIGN PATENT DOCUMENTS

| | | |
|---|---|---|
| JP | 09-064625 | 3/1997 |
| JP | 2001-326513 | 11/2001 |
| WO | WO 98/56066 | 12/1998 |

\* cited by examiner

*Primary Examiner*—Hoang V. Nguyen
(74) *Attorney, Agent, or Firm*—The Farrell Law Firm (57) ABSTRACT

Disclosed herein is an antenna device for a mobile phone having a body housing, a sliding housing for sliding up or down lengthwise along the body housing, a sliding module for connecting the sliding housing to the body housing in the manner that allows the sliding housing to slide up or down, and a main antenna device in the sliding housing. In the antenna device for the mobile phone, at least one sub-antenna device is installed lengthwise facing the sliding module and is electrically connected to or separated from the body housing, slidingly approaching or moving away from the body housing along with the sliding module, and at least one connection unit electrically connects the sub-antenna device to the body housing for signal transmission between the sub-antenna device and the body housing.

13 Claims, 9 Drawing Sheets

(PRIOR ART)

ANTENNA DEVICE FOR A MOBILE PHONE

This application claims priority under 35 U.S.C. § 119 to an application entitled "Antenna Device for a Mobile Phone" filed in the Korean Intellectual Property Office on Dec. 17, 2004 and assigned Serial No. 2004-107872, the contents of which are incorporated herein by reference.

BACKGROUND OF THE INVENTION

1. Field of the Invention

The present invention relates to an antenna device with a sub-antenna device configured to be electrically connected to or separated from a sliding up-type mobile phone, sliding up or down along the mobile phone.

2. Description of the Related Art

The term "portable communication device" typically refers to a device that allows a user to wirelessly communicate with an other party, while being convenient to carry. Portable communication devices include HHPs (Hand Held Phones), CT-2 (Cordless Telephones-2), cellular phones, digital phones, PCS (Personal Communications Service) phones, and PDAs (Personal Digital Assistants). The devices are classified into a plurality of types according to their appearance. For example, mobile phones are classified into a bar type, a flip type, a folder type, a sliding type, and a sliding-up type. The mobile phones each are provided with an antenna device, a data input/output device, and a data transmitter and receiver. An LCD (Liquid Crystal Display) is usually adopted as a visual data output device.

A keypad is typically provided for data input, basically as an array of keys. These keys include a Send (SND) key, a Cancel key, a Clear (CLR) key, an End key, a Power (PWR) key, alphanumerical keys, and other function keys.

A recent soaring increase in the number of mobile users indicates that mobile phones are becoming a necessity. Beyond the original function of making phone calls, the mobile phones can now be additionally used to listen to the radio, listen to MP3 music, and view moving pictures, and used as a remote control device.

Also, mobile phones have been developed to have a camera and support high-speed data communication. This implies that many devices are mounted into the mobile phone to satisfy various user demands. As these devices are used, they occupy various areas within the phone, and the area for installing a built-in antenna is reduced.

To allow the mobile phone to perform the above-described voice and other wireless functions, an antenna device is located at a proper position of a mobile phone to transmit and receive signals. The antenna device typically takes the form of a whip antenna or a helical antenna.

The helical antenna is more common in that it boasts of a decreased antenna height in an installed state. Unlike an extendable rod antenna, the helical antenna is detachably fixed to an upper end of a main body, having a portion extended upward in the mobile phone. The protruded configuration of the helical antenna limits the design options of mobile phones that use a helical antenna.

To overcome the drawback of the helical antenna, a built-in antenna device has become widespread in mobile phones.

Figure 1:
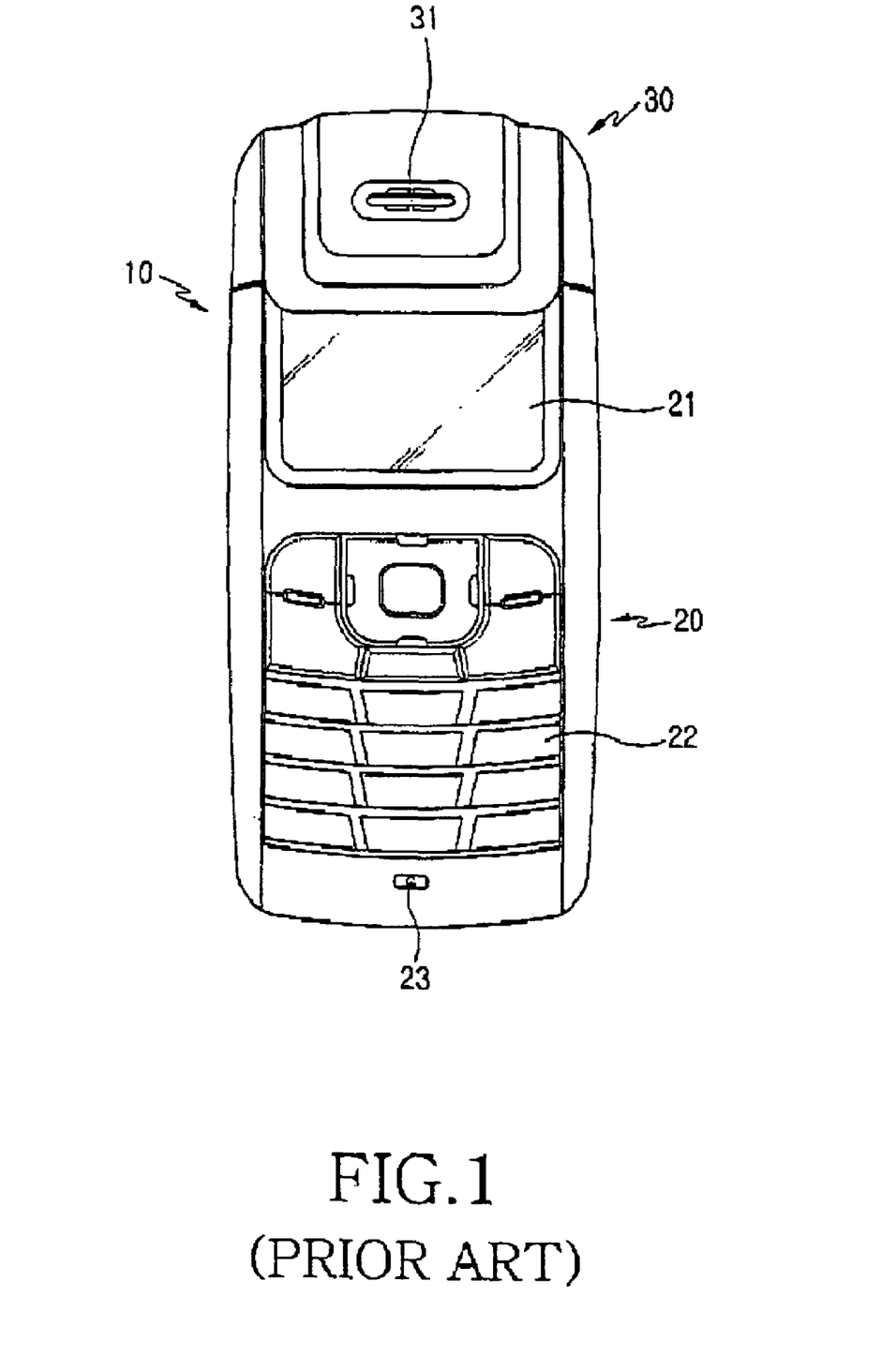
FIG. 1 is a front view of a conventional sliding up-type mobile phone in a sliding down state.
Figure 2:
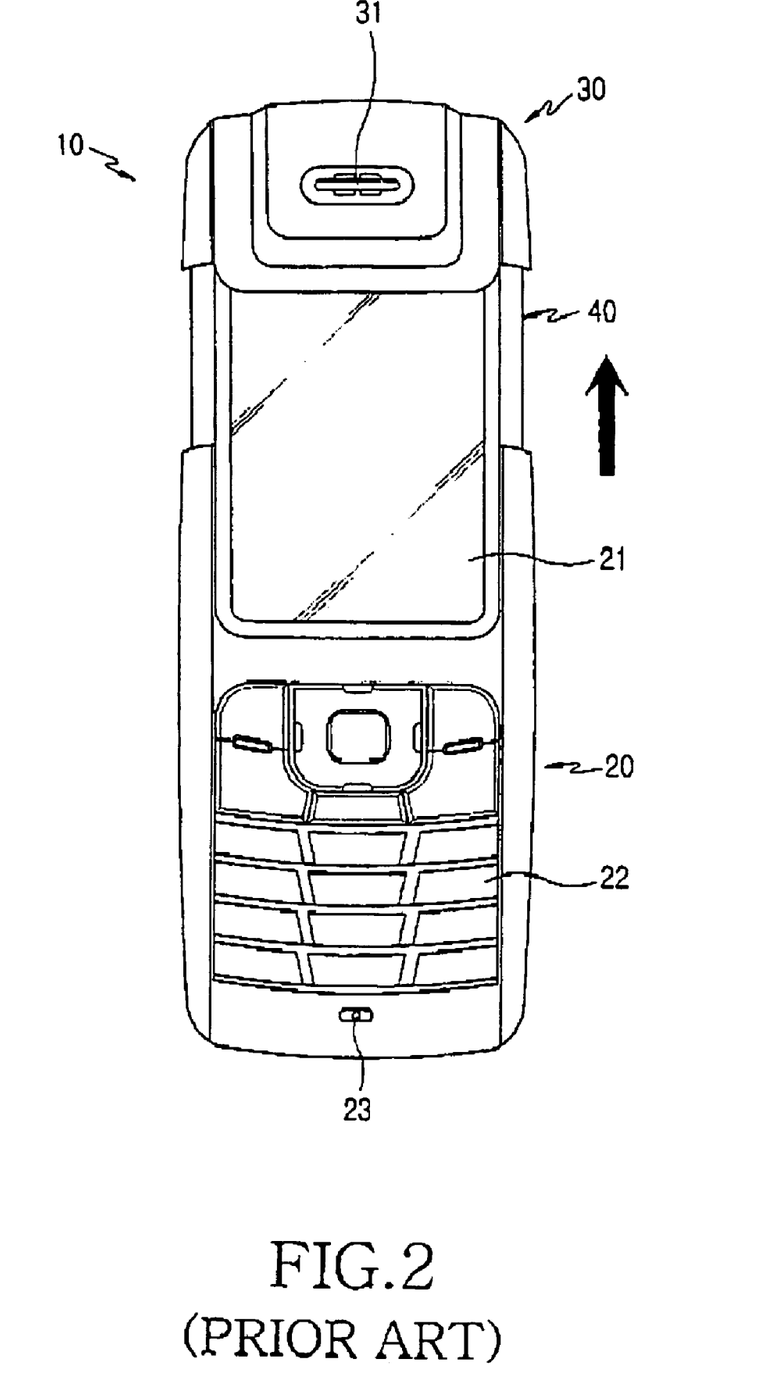
FIG. 2 is a front view of the conventional sliding up-type mobile phone in a sliding up state.
Figure 3:
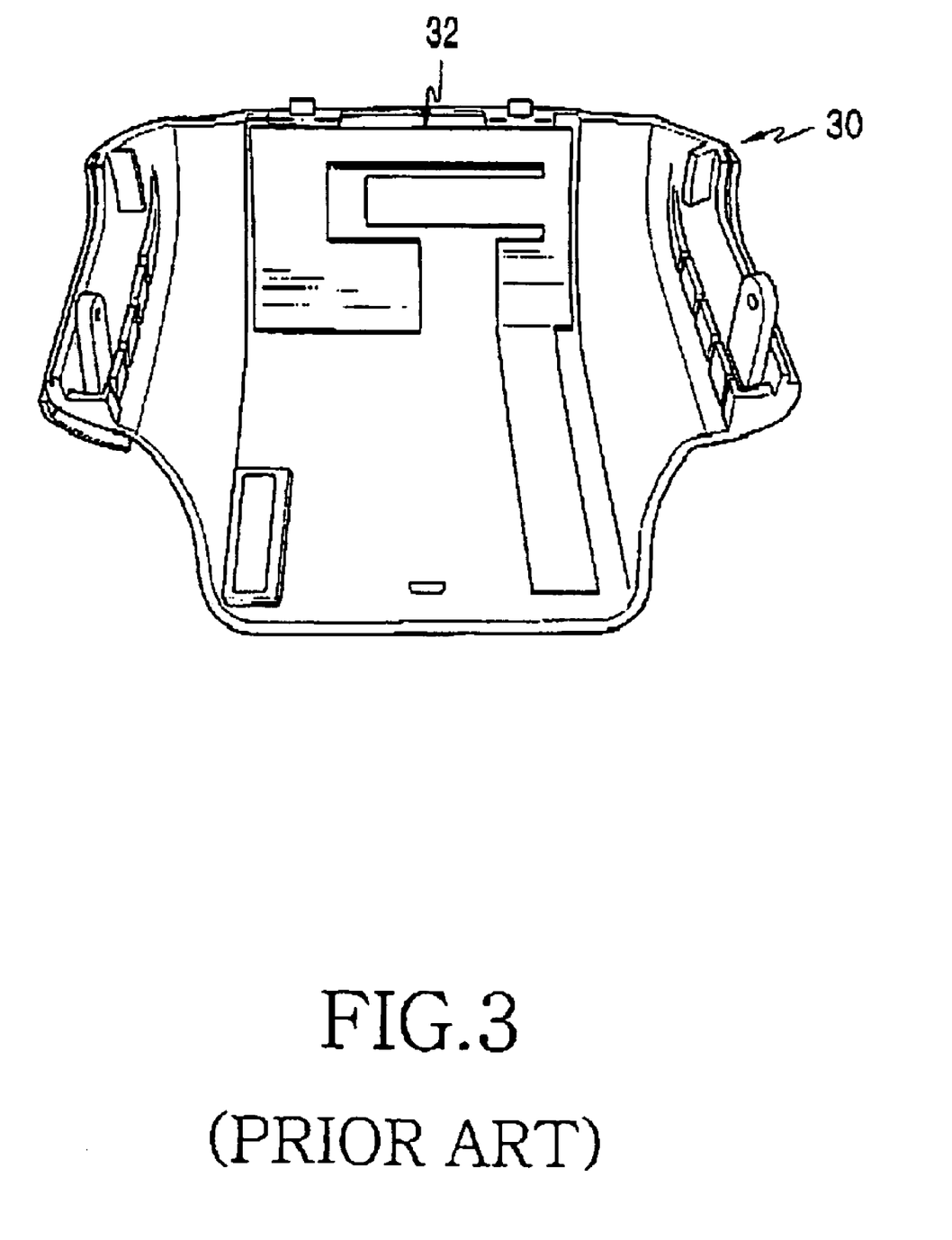
FIG. 3 illustrates an interior of a sliding housing in the conventional sliding up-type mobile phone illustrated in FIGS. 1 and 2.

Referring to FIGS. 1, 2 and 3, a sliding up-type mobile phone 10 includes a body housing 20, a sliding housing 30 disposed above the body housing 20, for sliding up/down to recede from/approach the body housing 20, and a sliding module 40 for connecting the sliding housing 30 to the body housing 20 in the manner that allows the sliding housing 30 to slide up/down. The body housing 20 has a display 21, an array of keys 22, and a microphone 23. The sliding housing 30 is provided with a speaker 31 and a main antenna device 32.

The conventional antenna device in the sliding up-type mobile phone is built on an inner surface of the sliding housing, to slide lengthwise. This configuration changes the impedance of the antenna device as the sliding housing slides up or down. Because the radiation performance of the mobile phone depends on impedance matching, an inappropriately matched impedance results in insufficient antenna orientation and gain, and makes it difficult to achieve maximum radiation performance.

SUMMARY OF THE INVENTION

An object of the present invention is to substantially solve at least the above problems and/or disadvantages and to provide at least the advantages below. Accordingly, an object of the present invention is to provide an antenna device with a sub-antenna device configured to be electrically connected to or separated from a sliding up-type mobile phone, sliding up or down along the mobile phone, in order to improve the antenna performance of the mobile phone.

Another object of the present invention is to provide an antenna device with a sub-antenna device configured to be electrically connected to or separated from a sliding up-type mobile phone, sliding up or down along the mobile phone, in order to improve the antenna performance of the mobile phone by minimizing the variation of antenna impedance through interaction between the sub-antenna device and an existing main antenna device.

The above objects are achieved through the provision of an antenna device for a mobile phone having a body housing, a sliding housing for sliding up or down lengthwise along the body housing, a sliding module for connecting the sliding housing to the body housing in the manner that allows the sliding housing to slide up or down lengthwise, and a main antenna device in the sliding housing. At least one sub-antenna device is installed lengthwise facing the sliding module and is electrically connected to or separated from the body housing, slidingly approaching or receding from the body housing along with the sliding module, and at least one connection unit electrically connects the sub-antenna device to the body housing for signal transmission between the sub-antenna device and the body housing.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention is described below with reference to the accompanying drawings. In the following description, well-known functions or constructions are not described in detail to avoid obscuring the invention with unnecessary detail.

Figure 8:
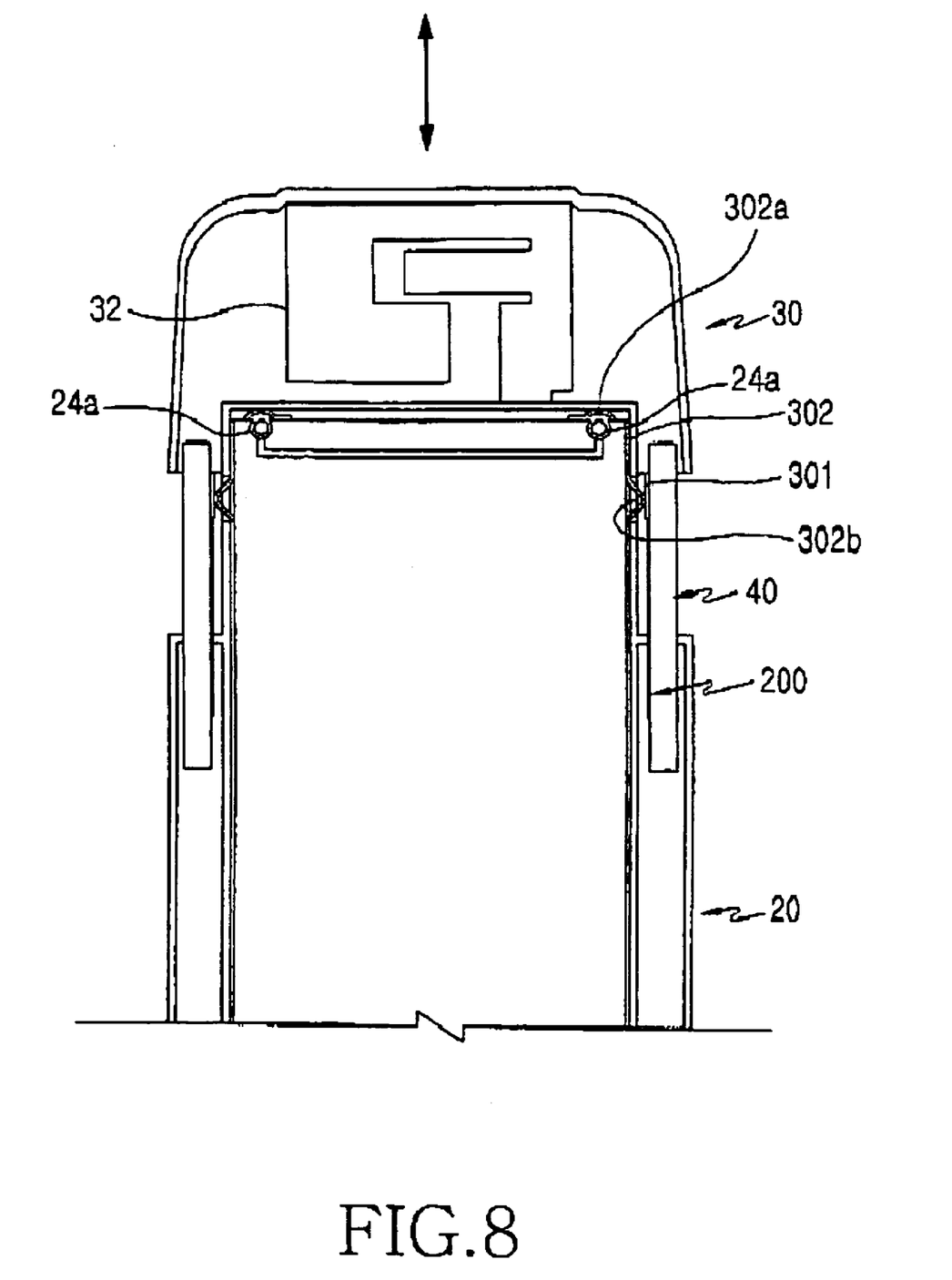
FIG. 8 is a front view of the antenna device after it operates in the mobile phone according to the embodiment of the present invention.
Figure 9:
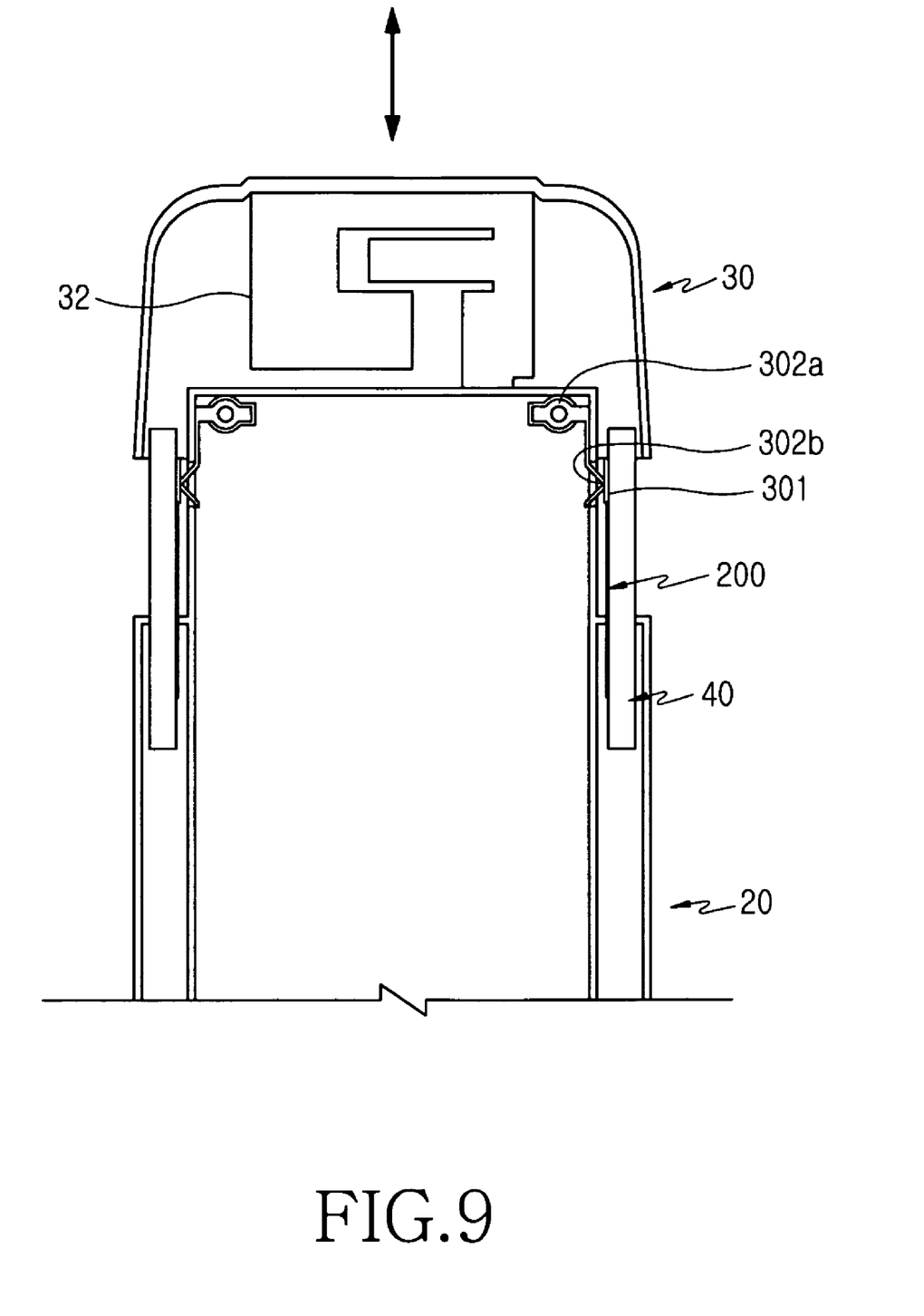
FIG. 9 is a front view of the antenna device in which the sub-antenna device is brought into contact with the connector in the mobile phone according to the embodiment of the present invention.

Referring to FIGS. 8 and 9, the sliding up-type mobile phone 10 in which an antenna device according to an embodiment of the present invention operates includes the body housing 20 extended in a lengthwise direction, the sliding housing 30 for sliding up or down along the length of the body housing 20, the sliding module 40 for connecting the sliding housing 30 to the body housing 20 in a manner that allows the sliding housing 30 to slide up or down in the lengthwise direction, and the main antenna device 32 in the sliding housing 30.

Figure 4:
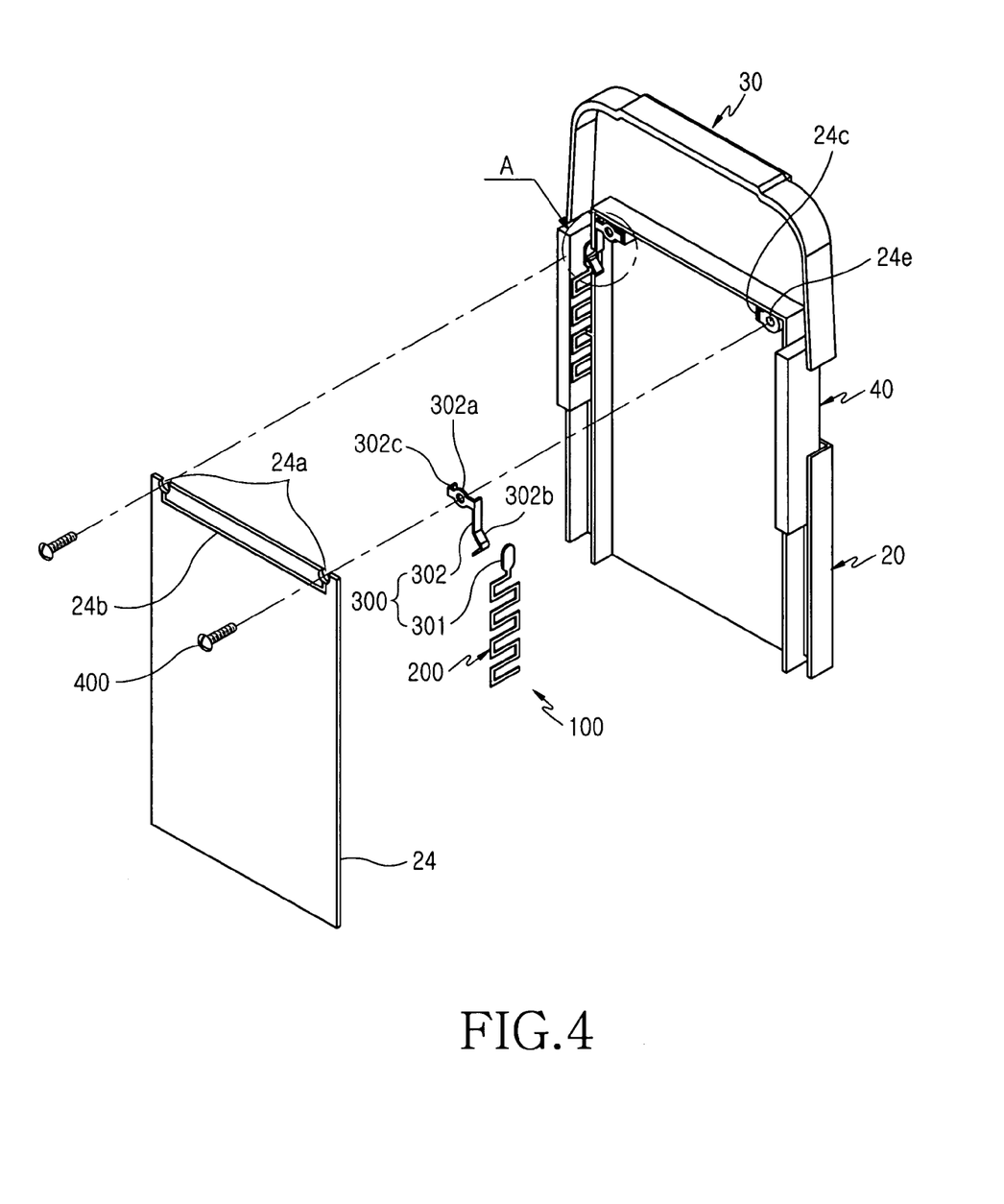
FIG. 4 is an exploded perspective view of an antenna device in a mobile phone according to an embodiment of the present invention.
Figure 5:
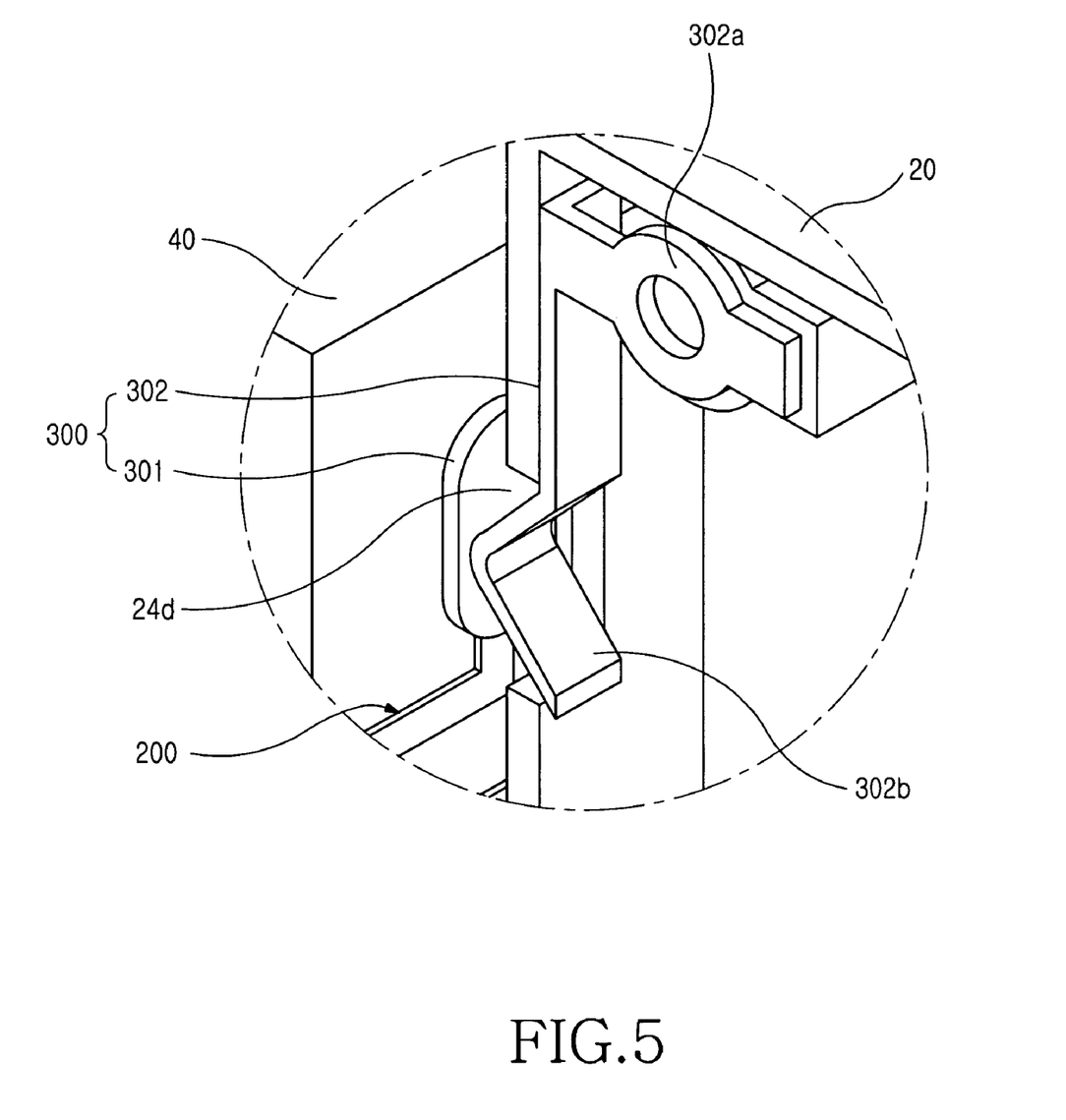
FIG. 5 is an enlarged perspective view of a portion A illustrated in FIG. 4.

Referring to FIGS. 4 and 5, the antenna device includes at least one sub-antenna device 200 (with two sub-antenna devices shown) and at least one connection unit 300 (with two connection units shown). The sub-antenna devices 200 are installed to face the sliding module 40 in the lengthwise direction so that they can be electrically connected to or separated from the body housing 20, with the sliding movement of the sliding module 40. The connection units 300 are installed in the body housing 20 and the sub-antenna devices 200 to electrically connect the sub-antenna devices 200 to the body housing 20 for signal transmission between the sub-antenna-devices 200 and the body housing 20.

Referring to FIG. 4, the sub-antenna devices 200 are preferably installed symmetrically facing each other with respect to the body housing 20 in the vicinity of the inner side surfaces of the sliding module 40, to improve antenna reception sensitivity as the sliding housing 30 slides up, receding from the body housing 20. The sub-antenna devices 200 are preferably formed in meander line antenna patterns.

Referring to FIGS. 5 to 9, each connection unit 300 includes a connection terminal 301 and a connector 302. The connection terminal 301 is provided at an end of the sub-antenna device 200 to be electrically connected to the connector 302 when it slides up in the lengthwise direction. A connector 302 is preferably provided at each side of the body housing 20 to electrically connect to a respective connection terminal 301 of a sub-antenna device 200. The connector 302 is formed of a metal to be electrically conductive.

As illustrated in FIGS. 4 and 5, each connector 302 is provided with a screw engagement portion 302a at an end thereof, for fitting around a screw hole 24e formed in the body housing 20 and allowing a screw 400 to fixedly extend therethrough.

The connector 302 is provided with a connection portion 302b at the other end thereof, for electrically connecting the connection terminal 301. A curved fixing portion 302c is formed at the screw engagement portion 302a, to be fixedly engaged with a fixing groove 24c in the body housing 20. The connection portion 302b is formed into a pin connector to be easily connected to the connection terminal 301 of the sub-antenna device. The pin connector is provided with a curved portion for providing elastic force. A connector hole 24d is formed in the body housing 20, for allowing the pin connector to extend therethrough and connect to the connection terminal 301.

Figure 6:
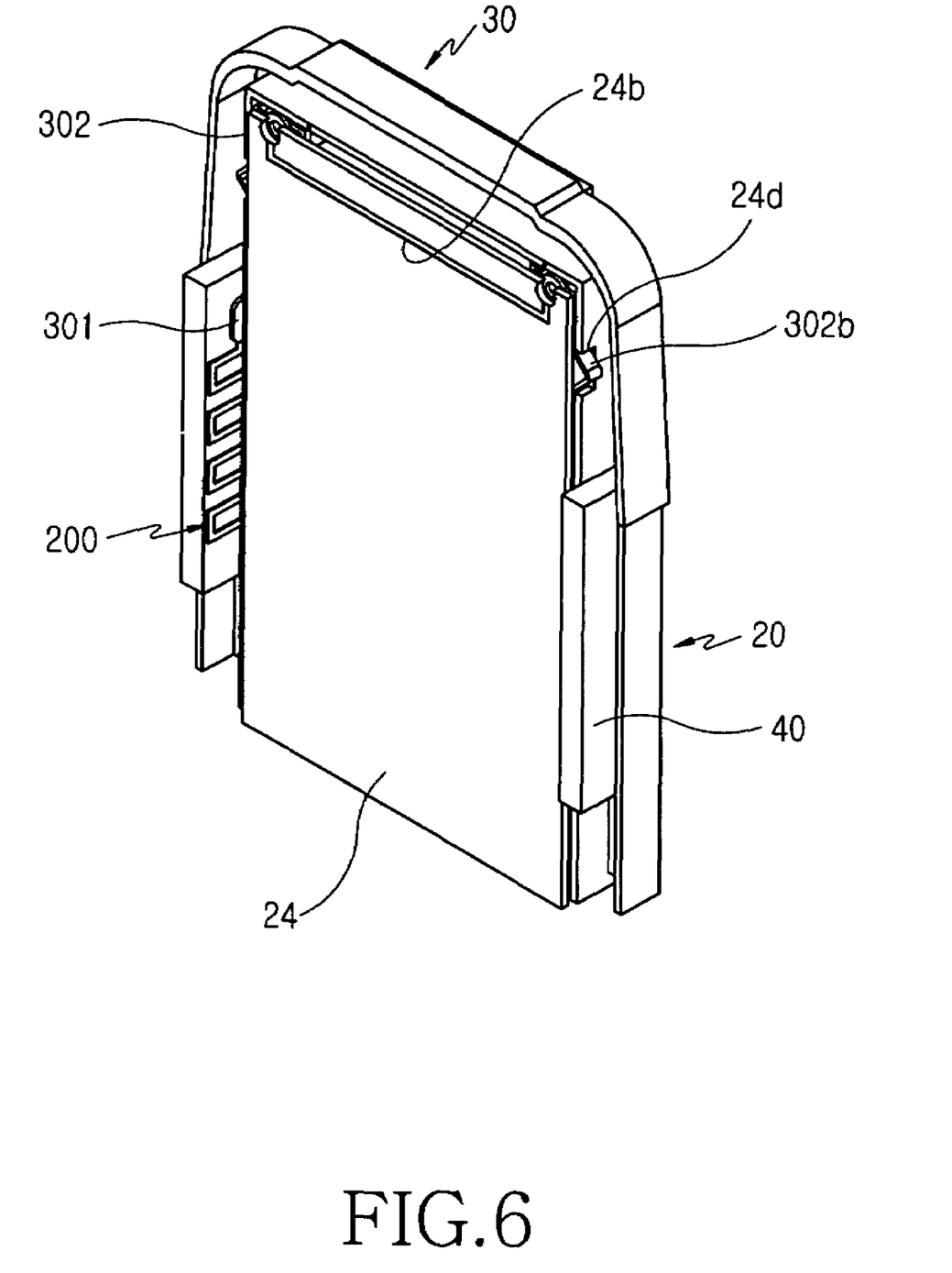
FIG. 6 is a perspective view of the antenna device in which a sub-antenna device is separated from a connector in the mobile phone according to the embodiment of the present invention.
Figure 7:
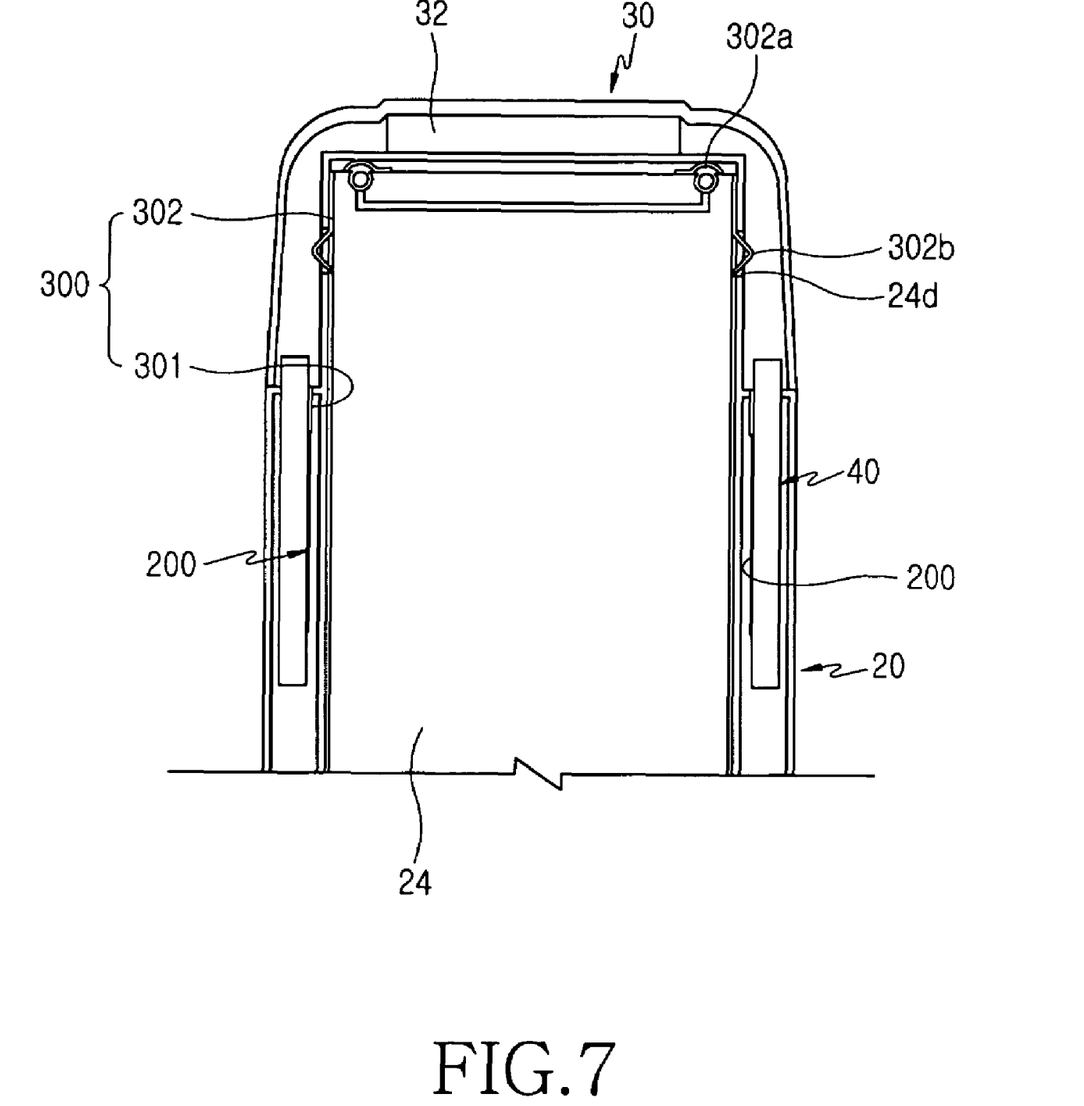
FIG. 7 is a front view of the antenna device before it operates in the mobile phone according to the embodiment of the present invention.

Referring to FIGS. 6 and 7, a Printed Circuit Board (PCB) 24 in the body housing 20 is provided with at least one antenna engagement portion 24a (with two antenna engagement portions shown) to be electrically engaged with the screw engagement portion 302a. A connection line 24b is formed between the antenna engagement portions 24a to electrically connect the antenna engagement portions 24a.

The operation of the thus-configured antenna device in the mobile phone according to the embodiment of the present invention will be described in detail with reference to FIGS. 4 to 9.

Referring to FIGS. 4 and 5, the sliding up-type mobile phone 10 is provided with one or more sub-antenna devices 200 facing the sliding module 40 in a lengthwise direction. The sub-antenna devices 200 are preferably installed in the sliding module 40 to symmetrically face each other with respect to the body housing 20.

FIGS. 8 and 9 show the sliding module 40 having been slid up with the sliding housing 30 to recede from the body housing 20 in the lengthwise direction. As illustrated in FIG. 9, the sub-antenna devices 200 slide up along with the sliding module 40 and are electrically connected to the connectors 302 in the body housing 20.

Specifically, the connectors 301 of the sub-antenna devices 200 are brought into contact with the connection portions 302b of the connectors 302. The connection portions 302b are extended and exposed through the connector holes 24d in the body housing 20. In this state, the connection portions 302b are connected to the connectors 301.

Thus, the sub-antenna devices 200 and the main antenna device 32 are used as an antenna, increasing the reception sensitivity of the antenna and improving impedance matching.

Referring to FIG. 8, since one or more antenna engagement portions 24a are provided on the PCB 24 within the body housing 20 to be electrically engaged with the screw engagement portions 302a, the connectors 302 are electrically connected to the PCB 24 by means of the antenna engagement portions 24a. The connection line 24b runs between and electrically connects the antenna engagement portions 24a.

Referring to FIGS. 6 and 7, as the sliding module 40 slides down with the sliding housing 30 to approach the body housing 20 in the lengthwise direction, the connection terminals 301 of the sub-antenna devices 200 are separated from the connection portions 302b of the connectors 302, sliding down along with the sliding module 40. In this state, only the main antenna device 32 within the sliding housing 30 acts as the antenna.

In accordance with the present invention as described above, a sub-antenna device is configured to electrically connect to or separate from a sliding up-type mobile phone, sliding up or down along the mobile phone. Therefore, antenna radiation performance can be improved by minimizing the variation of antenna impedance through interaction between the sub-antenna device and an existing main antenna device.

While the invention has been shown and described with reference to a certain preferred embodiment thereof, it is a mere exemplary application. For example, the present invention is applicable to any portable terminal. Thus, it will be understood by those skilled in the art that various changes in form and details may be made therein without departing from the spirit and scope of the invention as defined by the appended claims.

What is claimed is:

1. An antenna device in a mobile phone having a body housing, a sliding housing for sliding up or down in a lengthwise direction along the body housing, a sliding module for connecting the sliding housing to the body housing to allow the sliding housing to slide up or down, and a main antenna device installed on a first plane in the sliding housing, the antenna device comprising:
 at least one sub-antenna device installed in the lengthwise direction facing the sliding module and on a second plane perpendicular to the first plane, for electrically connecting to or separating from the body housing, slidingly approaching or moving away from the body housing along with the sliding module; and
 at least one connection unit for electrically connecting the at least one sub-antenna device to a main printed circuit board (PCB) installed on a third plane parallel to the first plane and in the body housing for signal transmission between the at least one sub-antenna device and the main PCB.

2. The antenna device of claim 1, wherein two sub-antenna devices are symmetrically installed with respect to the body housing in the vicinity of the inner side surfaces of the sliding module.

3. The antenna device of claim 1, wherein the at least one sub-antenna device is formed in a meander line pattern.

4. The antenna device of claim 1, wherein the at least one connection unit includes a connection terminal provided at one end of the at least one sub-antenna device, and a connector is provided at an end of the body housing for electrically connecting to the connection terminal.

5. The antenna device of claim 4, wherein the connector is formed of metal.

6. The antenna device of claim 4, wherein the connector includes a screw engagement portion at an end of the connector, for securing the connector to the body housing, and a connection portion at an other end of the connector, for being electrically connected to the connection terminal.

7. The antenna device of claim 6, wherein the screw engagement portion includes a curved fixing portion for fixedly engaging with a fixing groove formed in the body housing.

8. The antenna device of claim 6, wherein the connection portion is a pin connector.

9. The antenna device of claim 8, further comprising a connector hole formed in the body housing, for allowing the pin connector to extend through the connector hole.

10. The antenna device of claim 4, further comprising two antenna engagement portions in the main PCB, for being electrically connected to the screw engagement portion, and a connection line between antenna engagement portions, for electrically connecting the two antenna engagement portions.

11. The antenna device of claim 1, wherein as the sliding module slides up the sliding housing in the lengthwise direction away from the body housing, a connector of the at least one sub-antenna device slides up along with the sliding module and is electrically connected to a connection portion of the connector, whereby increasing reception sensitivity is achieved by using both the at least one sub-antenna device and the main antenna device as an antenna, and
 wherein, as the sliding module slides down the sliding housing in the lengthwise direction toward the body housing, the connector of the at least one sub-antenna device slides down along with the sliding module and is electrically separated from the connection portion of the connector, and only the main antenna device is used as the antenna.

12. An antenna device in a sliding type mobile phone having a body housing, a sliding housing for sliding up or down in a lengthwise direction along the body housing, and a main antenna device installed on a first plane in the sliding housing, the antenna device comprising:
 at least one sub-antenna device installed in the lengthwise direction in the sliding housing and on a second plane perpendicular to the first plane, for electrically connecting to or separating from the body housing, slidingly approaching or moving away from the body housing along with the sliding housing; and
 at least one connection unit for electrically connecting the at least one sub-antenna device to a main printed circuit board (PCB) installed on a third plane parallel to the first plane and in the body housing for signal transmission between the sub-antenna device and the main PCB.

13. An antenna device in a mobile phone having a body housing, a sliding housing for sliding up or down in a lengthwise direction along the body housing, a sliding module for connecting the sliding housing to the body housing to allow the sliding housing to slide up or down, and a main antenna device installed on a first plane in the sliding housing, the antenna device comprising:
 at least one sub-antenna device installed in the lengthwise direction facing the sliding module and on a second plane perpendicular to the first plane, for electrically connecting to or separating from the body housing; and
 at least one connection unit for electrically connecting the at least one sub-antenna device to a main printed circuit board (PCB) installed on a third plane parallel to the first plane and in the body housing for signal transmission between the at least one sub-antenna device and the main PCB.

* * * * *